May 22, 1951            P. A. MARSAL          2,553,662
APPARATUS FOR ACTUATING AN ELECTROMAGNETIC TYPE
CAMERA SHUTTER SYNCHRONIZER
Filed Aug. 15, 1947

INVENTOR
PAUL A. MARSAL
BY
D. C. Harrison
ATTORNEY

Patented May 22, 1951

2,553,662

UNITED STATES PATENT OFFICE 2,553,662

APPARATUS FOR ACTUATING AN ELECTROMAGNETIC TYPE CAMERA SHUTTER SYNCHRONIZER

Paul A. Marsal, Rocky River, Ohio, assignor, by mesne assignments, to Union Carbide and Carbon Corporation, a corporation of New York Application August 15, 1947, Serial No. 768,834

3 Claims. (Cl. 95—11.5)

This invention relates to apparatus for actuating a camera shutter synchronizer of the electromagnetic type, and has for an object to enhance the reliability of its operation. Another object is to remove the heavy current load these usually place on the dry battery operating it. A further object is to make the operation of the synchronizer independent of the internal resistance of the dry battery actuating it. Still a further object is to simplify the apparatus for operation of this device and make it compact.

The usual electromagnetic type synchronizer for operating a camera shutter in connection with a photoflash bulb has been of low resistance requiring high battery current. The current a dry cell is capable of giving depends to a large extent on its internal resistance. A cell could be made to give a high current by lowering its internal resistance through reduction in the amount of manganese dioxide depolarizer used but the useful life of such a cell is shortened. The operation of such a synchronizer and bulb could be made more reliable were dry cells to be manufactured exclusively for such use, that is capable of giving large amperage with short life, but the danger of such cells being used for other purposes where a longer life is needed has caused some manufacturers of cells to be unwilling to jeopardize their good will in such a manner. Most such manufacturers make a cell designed for long life under the condition in which most cells of a given size are likely to be used. For this reason the operation of the usual synchronizer and photoflash bulb has not been as reliable as desired. For example temperature and other conditions have been a source of trouble.

In an effort to eliminate these difficulties the present invention has been found to be useful. Specifically the amperage burden on the battery has been removed and reliability is enhanced by causing the battery to charge a condenser and then discharge that condenser to actuate the synchronizer through a low impedance circuit independent of the battery. In this way a compact condenser may be used by having a high battery voltage and a conveniently high battery voltage is obtainable from a compact, flat type, dry battery such as is used in connection with hearing aids, a battery of this sort with greatly increased voltage taking less space than the customarily used two or three cells of the ordinary flashlight size.

Referring to the drawing.

Figure 1:
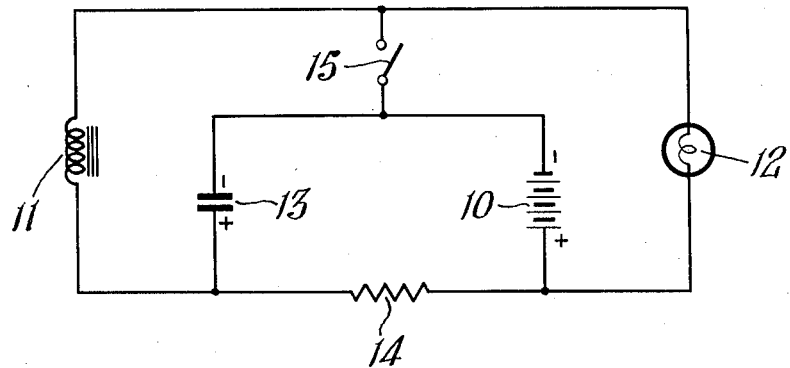
Fig. 1 is a wiring diagram of one embodiment of this invention.

Referring to Fig. 1 of the drawing, a dry battery 10 comprised of four penlight type cells was connected as shown to charge a condenser 13 of 2000 microfarads through a high resistance 14 of 1000 ohms. The coil 11 is that of an electromagnetic type synchronizer camera shutter actuator not illustrated. A photoflash bulb 12 is also connected to be fired by the battery 10 upon closing a switch 15. When this switch 15 is closed two circuits are formed, the first is a low impedance circuit enabling the condenser to be discharged through the synchronizer coil 11 independently of the internal resistance of the battery 10. Depending on the size of the condenser 13 actuation of the synchronizer may be amply provided for and actuated with certainty irrespective of the internal resistance of the battery 10. The other circuit is that through the photoflash bulb 12 on closing the switch 15. The filament of the photoflash bulb burns out in a few milliseconds to prevent any prolonged drain on the battery 10.

Figure 2:
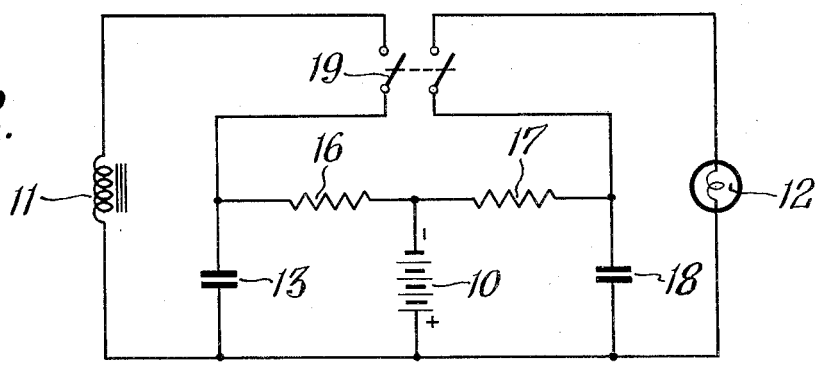
Fig. 2 is a wiring diagram of a preferred embodiment of the present invention.

In Fig. 2 the same dry battery 10 is used for firing the photoflash bulb 12 on actuating the electromagnetic synchronizer 11, but in this case each of the bulbs 12 and coil 11 is supplied with current through a condenser placed across the battery as illustrated. The condenser 13 is of the same size and type described previously in connection with Fig. 1 and the same is true of the resistance 16 which has the ohmic value as mentioned for the resistance 14 in Fig. 1. To make the firing of the photoflash bulb 12 independent of the battery 10 it is fired by discharge to a condenser 18 also of the same capacity as the condenser 13. The resistance 17 is of the same value as resistance 16. On closing the single throw double pole switch 19 each of the coil 11 and bulb 12 is actuated through a low impedance circuit independent of the battery.

Figure 3:
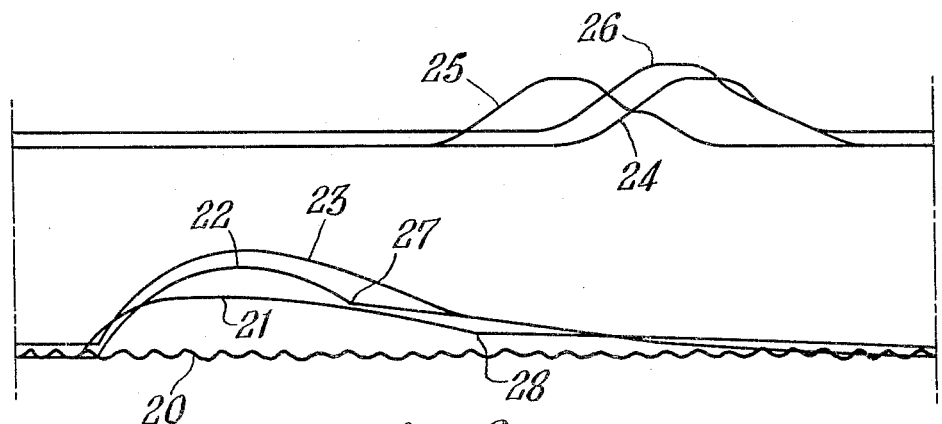
Fig. 3 is a reproduction of an oscillogram illustrating the action of the present invention so far as current flow and timing are concerned.

In Fig. 3 the serrated line 20 is an oscillograph record obtained with the aid of a 1000 cycle tuning fork and a photoelectric cell so that the time between any two adjacent peaks in the line 20 is one millisecond. The curve 21 represents an oscillogram of current flow through the synchronizer coil 11 and discharge from the condenser 13. The ascending portion of this curve is gradual as indicated due to the inductance of the low impedance circuit including the coil 11 and independent of the battery. The descending portion of the curve 21 is gradual due to the large capacity of the condenser 13 and the presence of an ohmic resistance in series with the coil 11 of 1½ ohms. Point 28 in this curve indicated where the movable armature of the synchronizer coil was closed lowering the reluctance of the magnetic circuit through the core and armature of synchronized coil 11. Curve 24 was produced with the aid of a photoelectric cell in response to light transmitted through the shutter of a camera when the same was actuated by the synchronizer coil 11. The shutter was set for an opening of 1/200 of a second. It will be seen the mid portion of the shutter opening occurred approximately 19 milliseconds after closing the switch 15. Curve 22 was obtained with the same apparatus except that the 1½ ohm resistance had been removed from the synchronizer circuit causing the value of the current discharged from the condenser to be larger and its flow of shorter duration, the change in the current flow line at the point 27 being due to the armature of the electromagnet being closed quicker with the higher current. The curve 25 results from the shutter opening upon actuation of the synchronizer 11 as portrayed by the current flow and curve 22. It will be seen that the shutter opening without the presence of the 1½ ohm resistance in the synchronizer circuit occurred too soon after closing the switch 15. That is due to the design of the electromagnetic synchronizer for actuating a camera shutter; the manufacturers of photoflash bulbs have made them so the light peak is customarily about 20 milliseconds after closing switch 15. Therefore the curve 22 illustrates how the synchronizer actuated from a condenser discharged from a low impedance circuit may cause the armature of the synchronizer magnet to be closed too soon resulting in opening the camera shutter too soon, that is, without the customary 20 milliseconds interval to obtain maximum light peak from the photoflash bulb. This reduced time of shutter actuation is due to the condenser supplying a much stronger current pulse to the electromagnet of the synchronizer 11 than is obtained by the use of dry cells of lower internal resistance without a condenser being used.

To lengthen the time between closure of the switch 15 and actuation of the camera shutter several expedients have been found practicable. One was the inclusion of an ohmic resistance of the value for example mentioned in connection with obtaining the curve 21. Another expedient was obtained in the case of the curve 23 when the armature of the magnet was given a greater amplitude or travel by backing it off from the position it occupied in obtaining the curves 21 and 22. The shutter opening 26 was delayed about four milliseconds longer than was the case with curve 25. Other ways of obtaining a delayed action for the camera shutter have included the use of short circuited turns on the pole piece of the synchronizer magnet. Yet another way of obtaining delayed action for the shutter may be by the inclusion of additional friction or other well known mechanical delay action expedients.

Instead of the penlight cells it has been found practicable to use a higher voltage battery made of some compact flat type dry cells such as are commonly used in connection with hearing aids. With higher voltage batteries, condensers of lower capacity and therefore greater compactness may be obtained. The condensers used were of the dry electrolytic type for the sake of compactness. A 15 volt dry battery made up of flat type cells occupies no more than 1 3/2″ by 5/8″ by 1 15/32″. Using a 15 volt battery and a 2500 ohm resistance 16 the condenser 13 was charged in approximately two seconds. The dry battery having flat type cells is better adapted for the embodiment illustrated in Fig. 2 than for Fig. 1 because in Fig. 2 neither the synchronizer 11 nor the bulb 12 is ever placed directly on the battery. With larger resistances 16 and 17 the current flow in charging the condensers 13 and 18 is so small that a battery may be used hundreds of times to actuate both a photoflash bulb and camera shutter synchronizer.

Among the advantages of this invention may be mentioned that by using the condenser 13 for actuation of the synchronizer 11 the camera shutter may be operated at a definite time interval which is not critical or subject to change as has been the case when the synchronizer has been charged from the battery directly. With the embodiment illustrated in Figs. 1 and 2 the actuation of the camera shutter is independent of the internal resistance of the battery and therefore independent of weather, use and other causes affecting internal resistance of those batteries heretofore used for actuating the shutter synchronizer. With the present invention it is now possible to use any well known type dry battery since the internal resistance of the battery is no longer important in determining the size of the actuating pulse of current flowing to the synchronizer coil. Instead of having to select specially prepared low resistance dry cells, any well known make of dry cells having much higher internal resistance and therefore longer life with a larger percentage of depolarizer is appropriate. The current flow for charging the condenser 13 in Fig. 1 is very small compared to the current flow from the battery for firing the bulb 12 so that having the condenser 13 connected across the battery 10 should not affect the life of the battery substantially, the loss due to leakage being small. While not shown a second switch in series with the battery 10 may be provided if desired to eliminate even such small losses as occur when condensers 13 and 18 are connected permanently across the battery 10, to thereby prolong the shelf life of the battery. Perhaps a chief advantage of the present invention may be said to reside in the actuation of the camera shutter synchronizer removing the large ampere burden from a dry battery.

I claim:

1. In apparatus for firing a photoflash bulb and electromagnetic type synchronizer camera shutter actuator from a dry battery the combination therewith of the improvement rendering such firing and actuation independent of the internal resistance of the dry battery, and comprising a pair of condensers, one of capacity to actuate the synchronizer from the battery voltage and the other of capacity to fire the photoflash bulb at the same voltage, said condensers each being in parallel across said battery, and a low impedance circuit for each condenser, one such low impedance circuit including a switch, the synchronizer and one condenser, the other low impedance circuit including the photoflash bulb, a second switch, and the other condenser, said battery being independent of each low impedance circuit, said switches being connected for simultaneous actuation.

2. In apparatus for firing a photoflash bulb and electromagnetic type synchronizer camera shutter actuator from a dry battery the combination therewith of the improvement rendering such firing and actuation independent of the internal resistance of the dry battery, and comprising a pair of condensers, one of capacity to actuate the synchronizer from the battery voltage and the other of capacity to fire the photoflash bulb at the same voltage, said condensers each being in parallel across said battery, and a low impedance circuit for each condenser, one such low impedance circuit including a switch, the synchronizer and one condenser, the other low impedance circuit including the photoflash bulb, a second switch, and the other condenser, said battery being independent of each low impedance circuit, and a current limiting resistance in series with each condenser and the battery, said switches being connected for simultaneous actuation.

3. In apparatus for firing a photoflash bulb and electromagnetic type synchronizer camera shutter actuator from a dry battery the combination therewith of the improvement rendering such firing and actuation independent of the internal resistance of the dry battery, and comprising a pair of condensers, one of capacity to actuate the synchronizer from the battery voltage and the other of capacity to fire the photoflash bulb at the same voltage, said condensers each being in parallel across said battery, and a low impedance circuit for each condenser, one such low impedance circuit including a switch, the synchronizer and one condenser, the other low impedance circuit including the photoflash bulb, a second switch, and the other condenser, said battery being independent of each low impedance circuit, said dry battery being of the flat compact type used in hearing aids, and each condenser being of the compact dry electrolyte type, said switches being connected for simultaneous actuation.

PAUL A. MARSAL.

REFERENCES CITED

The following references are of record in the file of this patent:

UNITED STATES PATENTS

| Number | Name | Date |
| --- | --- | --- |
| 1,939,332 | Bouwers | Dec. 12, 1933 |
| 1,986,513 | Mendelsohn | Jan. 1, 1935 |
| 2,086,913 | Kelly, Jr. | July 13, 1937 |
| 2,161,355 | Jacobson | June 6, 1939 |
| 2,344,645 | Schwarz | Mar. 21, 1944 |
| 2,347,194 | Holliday | Apr. 25, 1944 |
| 2,391,611 | Bock | Dec. 25, 1945 |
| 2,395,600 | Weisglass | Feb. 26, 1946 |
| 2,432,084 | Blair | Dec. 9, 1947 |
| 2,447,832 | Alend et al. | Aug. 24, 1948 |
| 2,462,852 | Frankel | Mar. 1, 1949 |
| 2,464,188 | Spinks | Mar. 8, 1949 |
| 2,486,010 | Edgerton | Oct. 25, 1949 |